(12) United States Patent
Flach et al.

(10) Patent No.: US 11,112,887 B2
(45) Date of Patent: Sep. 7, 2021

(54) REMOVABLE BUTTON MEMBERS FOR ELECTRONIC POINTING DEVICES

(71) Applicant: Hewlett-Packard Development Company, L.P., Spring, TX (US)

(72) Inventors: Matthew Flach, Fort Collins, CO (US); James Glenn Dowdy, Fort Collins, CO (US); Dimitri Collins-Elder, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/648,739

(22) PCT Filed: Oct. 9, 2017

(86) PCT No.: PCT/US2017/055771
§ 371 (c)(1),
(2) Date: Mar. 19, 2020

(87) PCT Pub. No.: WO2019/074480
PCT Pub. Date: Apr. 18, 2019

(65) Prior Publication Data
US 2020/0272252 A1 Aug. 27, 2020

(51) Int. Cl.
*G06F 3/0354* (2013.01)
(52) U.S. Cl.
CPC .. *G06F 3/03543* (2013.01); *G06F 2203/0333* (2013.01)
(58) Field of Classification Search
CPC ..... G06F 2203/0332; G06F 2203/0333; G06F 2203/0334; G06F 2203/0336; G06F 1/169; G06F 3/033; G06F 3/03543; G06F 3/0383; G06F 3/0346; G06F 3/0354
See application file for complete search history.

(56) References Cited

U.S. PATENT DOCUMENTS

| | | |
|---|---|---|
| 6,697,251 B1 | 2/2004 | Aisenberg |
| 9,128,539 B2 | 9/2015 | Ng |
| 9,389,705 B2 | 7/2016 | Young et al. |
| 9,417,707 B2 | 8/2016 | Ng |

(Continued)

FOREIGN PATENT DOCUMENTS

EP 2426577 A1 3/2012

OTHER PUBLICATIONS

Programming Gaming-mouse Buttons Using Logitech Gaming Software, Aug. 12, 2014, 4 pages, http://support.logitech.com/en_hk/article/26862?product=a0qi00000069uqpAAA.

*Primary Examiner* — Dong Hui Liang
(74) *Attorney, Agent, or Firm* — Conley Rose PC

(57) ABSTRACT

An electronic pointing device includes a housing. In addition, the electronic device includes a position transducer coupled to the housing. Further, the electronic pointing device includes a plurality of electrical switches coupled to the housing. Still further, the electronic pointing device includes a cover plate removably coupled to the housing. The cover plate includes a plurality of holes, each hole aligned with one of the plurality of electrical switches. The electronic pointing device also includes a plurality of button members. Each button member is removably disposed in one of the holes of the cover plate and disposed to engage the corresponding, aligned electrical switch to actuate that electrical switch.

12 Claims, 4 Drawing Sheets

(56) References Cited

U.S. PATENT DOCUMENTS

| | | |
|---|---|---|
| 9,417,716 B2 | 8/2016 | Ludwig |
| 9,431,189 B2 | 8/2016 | Filson et al. |
| 2007/0188452 A1* | 8/2007 | Chen .................... G06F 3/0202 |
| | | 345/163 |
| 2007/0211030 A1* | 9/2007 | Hong ................... G06F 3/0202 |
| | | 345/163 |
| 2007/0222754 A1* | 9/2007 | Chen ................... G06F 3/03543 |
| | | 345/163 |
| 2009/0046064 A1* | 2/2009 | Manalo ............... G06F 3/03543 |
| | | 345/164 |
| 2010/0231514 A1* | 9/2010 | Min-Liang ......... G06F 3/03543 |
| | | 345/163 |
| 2011/0028194 A1* | 2/2011 | Tang .................. G06F 3/03543 |
| | | 463/1 |
| 2012/0081284 A1* | 4/2012 | Wu .................... G06F 3/03543 |
| | | 345/163 |
| 2013/0093678 A1 | 4/2013 | Gordon et al. |
| 2013/0328781 A1* | 12/2013 | Pate ................... G06F 3/03543 |
| | | 345/168 |
| 2015/0138093 A1* | 5/2015 | Young ................. G06F 3/0312 |
| | | 345/166 |
| 2017/0045959 A1* | 2/2017 | Chen ................... G06F 3/03543 |
| 2017/0220132 A1* | 8/2017 | O'Mahony ......... G06F 3/03543 |

\* cited by examiner

REMOVABLE BUTTON MEMBERS FOR ELECTRONIC POINTING DEVICES

BACKGROUND

Electronic pointing devices allow users to interact with computers, gaming console, and other devices. Examples of electronic pointing devices include: a mouse, a track ball, a game controller, a joystick, and a hand held pointer. Electronic pointing devices include buttons and other transducers that are placed in a physical arrangement determined by the manufacturer.

BRIEF DESCRIPTION OF THE DRAWINGS

Various examples are described below referring to the following figures.

DETAILED DESCRIPTION

Figure 1:
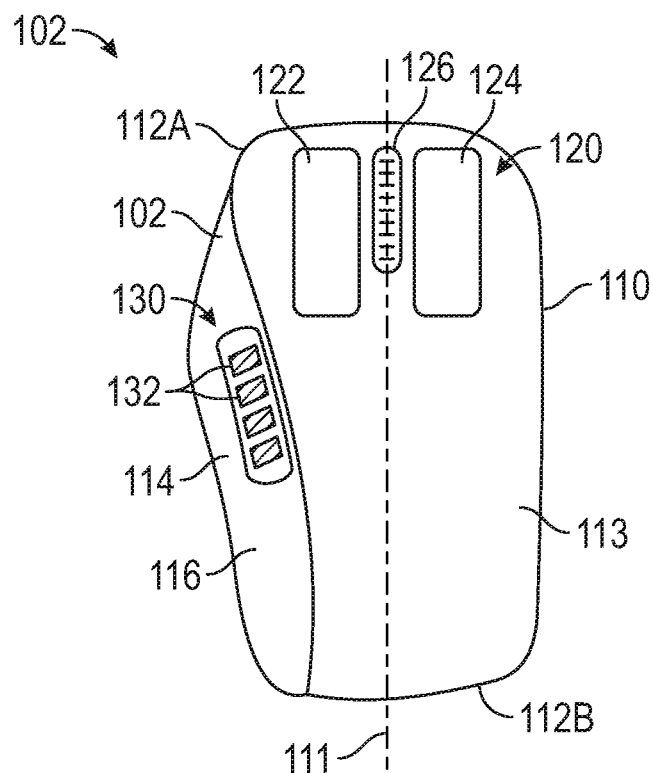
FIG. 1 shows a top view of an electronic pointing device in accordance with various examples.

In the following discussion and in the claims, the terms "including" and "comprising" are used in an open-ended fashion, and thus should be interpreted to mean "including, but not limited to . . . ." Also, the term "couple" or "couples" is intended to be broad enough to encompass both indirect and direct connections. Thus, if a first device couples to a second device, that connection may be through a direct connection or through an indirect connection via other devices, components, and connections. The terms, "removable," "removably disposed," "removably attached," and the like refer to a component or member that is designed to be removed or reinstalled individually without damaging the functionality of the member and without damaging the functionality of the component that releases or receives the component or member.

As used herein, including in the claims, the word "or" is used in an inclusive manner. For example, "A or B" means any of the following: "A" alone, "B" alone, or both "A" and "B." The term "button" refers to a component that includes an electrical switch and a button member coupled to the electrical switch to activate the electrical switch. Using a computer keyboard as an example, a plastic key, which typically includes a symbol printed on it, is a button member, and this button member is coupled to an electrical switch underneath it. Together, the plastic key and the electrical switch fit the definition of a button.

The concepts disclosed herein pertain to electronic pointing devices with configurable buttons. In an example, the devices include a matrix of mechanically configurable buttons that include electrical switches actuated by removable button members. The matrix can be customized by a user to activate select buttons and deactivate other buttons. In general, the pointing devices may be used to move a pointer or perform an operation on an electronic device, such as a desktop computer, a laptop computer, a tablet, etc. For example, the pointing devices may be used to perform actions within gaming software. As used herein including the claims, software, such as an operating system or a program, includes machine readable instructions stored on an electronic memory device.

An example pointing device includes a housing containing a position transducer (such as a rolling ball coupled to a pair of motion sensors, a light emitter-receiver pair, or a joy stick, as examples), a first set of physical buttons for actuating common software commands (e.g., left, middle, or right mouse buttons actuated by the index finger and middle finger), a scroll-wheel, a second set of physical buttons for actuating special or user programmable software commands (e.g., thumb actuated buttons), and electronics to communicate between the foregoing components. The physical lay-out of the second set of buttons is customizable by a user to suit user preferences regarding software operation, comfort, and visual aesthetics. In some examples, the functions of the first set of buttons is primarily established by the operating system of the electronic device, and the functions of second set of buttons is primarily established by software programs that a user chooses to run. As is common, the user may be able to configure how the software (e.g., the operating system or a software program) interprets a particular button within the first or second set of buttons. The term "mouse button" is used broadly. The first set of physical buttons, which may include "mouse buttons," may be included on any type of pointing device, including a traditional mouse, a trackball, a game controller, a joystick, and a hand held pointer, as examples.

The second set of buttons includes a plurality of electrical switches arranged in a prescribed matrix pattern within the housing, a perforated cover plate removably coupled to housing over the electrical switches, and a plurality of button members extending from the electrical switches and through the cover plate. More specifically, the cover plate includes a plurality of holes arranged in same pattern as the switches. Each button member extends from one of the plurality of electrical switches through one of the plurality of holes. A button member performs as an extension piece, allowing a user to push the button member to activate the corresponding electrical switch behind the cover plate. The cover plate is removably attached to the housing. Each button member is removable from the cover plate and may be individually replaced by a non-moving insert/plug or by nothing. Any of the holes in the cover plate may have a button, a non-moving insert, or nothing. An electrical switch that is located behind a hole having a button member disposed therein is operable by a user. An electrical switch located behind a hole without a button member disposed therein, which may be covered by a non-moving insert or covered by an overlay, is not operable by a user during normal operation. The pattern of the electrical switches and holes for the second set of buttons is established by the manufacturer, but the user may choose how many button members are installed and where they are installed in cover plate. If desired, a plug may be removed and replaced by a button. In this manner, the user may choose which switches are active and which switches are inactive or inaccessible, and the spacing between active buttons.

Figure 2:
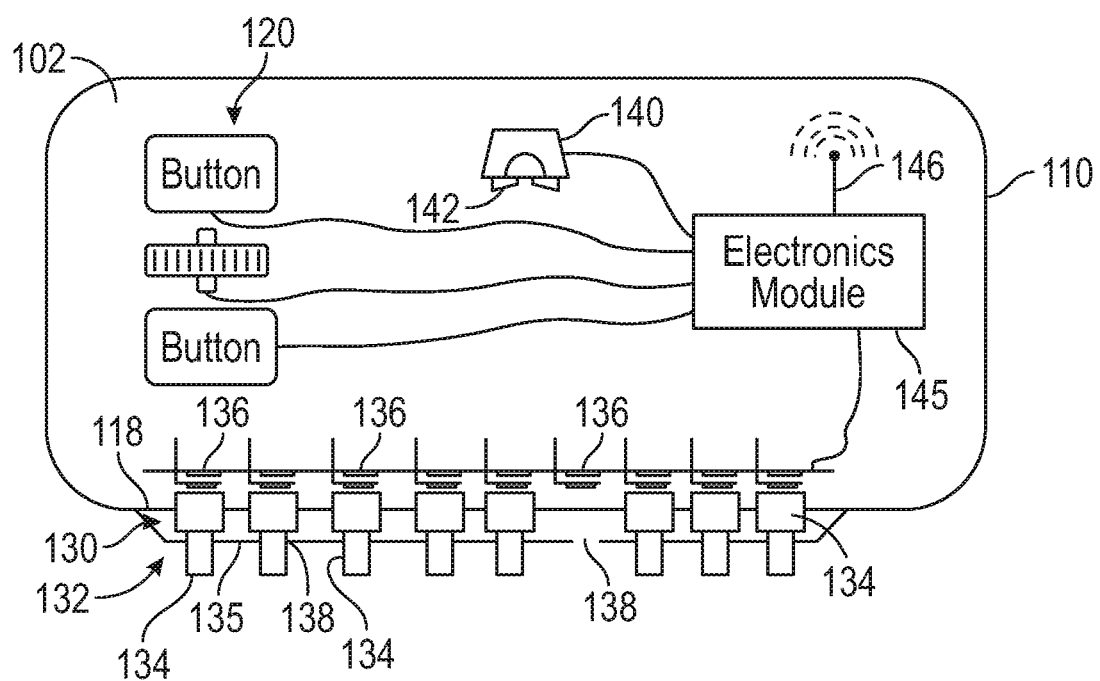
FIG. 2 shows a schematic view of the electronic pointing device of FIG. 1 in accordance with various examples.

Referring now to FIG. 1 and FIG. 2, an electronic pointing device 102 includes a housing 110, a first set of buttons 120 coupled to housing 110, a second set of buttons 130 coupled to housing 110, and a position transducer 140 coupled to housing 110. An electronics module 146 is disposed within housing 110 and is electrically coupled to buttons 120, 130 and transducer 140. Housing 110 includes a reference axis 111 extending from a front end 112A to a back end 112B, a top surface 113, and a contoured lateral surface 116 extending laterally (to the left of axis 111 in FIG. 1) from top surface 113. A thumb location 114 is disposed along lateral surface 116, and an access aperture 118 extending through lateral surface 116 within thumb location 114.

Housing 110 performs both as a framework and a covering for internal components. In some examples, a housing 110 may include frame members coupled to and covered by an outer shell. In some examples, housing 110 may be divided into separable parts, which can be separated or removed from each other to allow internal access for repair, replacement, or adjustment of components coupled to the housing.

Referring still to FIG. 1 and FIG. 2, first set of buttons 120 is located along top surface 113 proximal front end 112A and includes a left button 122, a right button 124, and a scroll wheel 126 positioned between buttons 122, 124. In addition to being a rotating transducer, scroll wheel 126 may also function as a third button. Second set of buttons 130 is located along thumb location 114 of lateral surface 111, and thus, are positioned to be actuated by a thumb of a user of pointing device 102. Second set of buttons 130 includes a plurality of buttons 132 comprising a plurality of button members 134 held by a cover plate 135 in alignment with a plurality of electrical switches 136 coupled to housing 110. Cover plate 135 is removably coupled to housing 110. In general, cover plate 135 may be coupled to housing 110 by removable fasteners or by built-in clips or notches, as examples. Cover plate 135 includes a plurality of holes 138, each hole 138 being aligned with one of the electrical switches 136. Each button member 134 is independently removably disposed in one of the holes 138 and is aligned and positioned in engagement with the corresponding the electrical switch 136, thereby enabling the button member 134 to actuate the corresponding electrical switch 136. In various examples, removing, installing, or swapping a button member 134 involves removing and reinstalling cover plate 135. With this configuration, each button member 134 may be individually and independently removed from the corresponding hole 138 of cover plate 135 and from the corresponding electrical switch 136.

Position transducer 140 includes an emitter-receiver pair 142 to sense movement of housing 110 relative to a surrounding environment, such as a physical desktop, tabletop, or countertop, as examples.

First set of buttons 120, second set of buttons 130, and position transducer 140 are electrically or wirelessly coupled to electronics module 145, which includes wireless communications equipment 146 to transmit data between pointing device 102 and another electronics device, such as a computer or a game console, as examples. In some examples, electronics module 145 includes a wired connection to couple device 102 and another electronics device for data exchange. In some of these examples, the wired connection includes a universal serial bus (USB) communication protocol.

Figure 3:
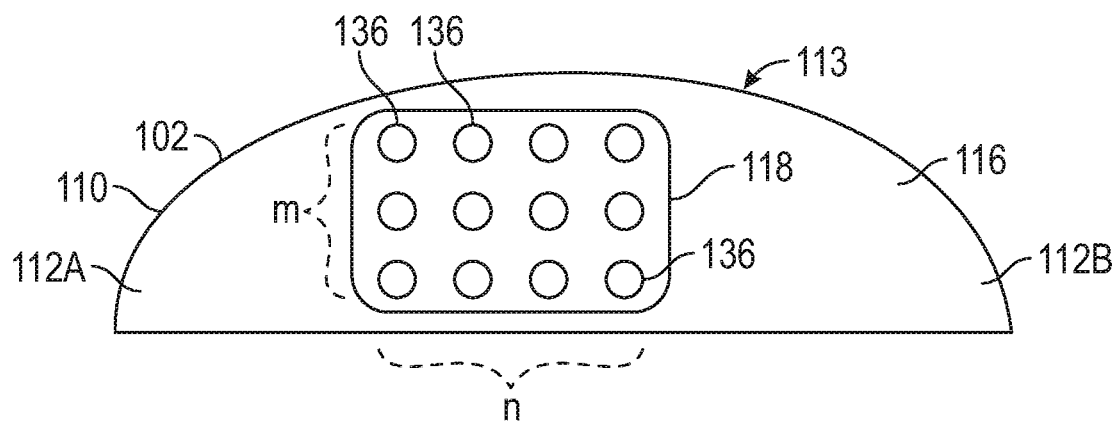
FIG. 3 shows a side view of the electronic pointing device of FIG. 1 in accordance with various examples.

The side view of FIG. 3 shows a vertical projection of lateral surface 116 on pointing device 102 with cover plate 135 and button members 134 removed. In this example, electrical switches 136 are arranged in an m×n (i.e., "m by n") matrix within housing 110 and visible through aperture 118. The parameter "m" is the number of horizontal rows in the matrix, and parameter "n" is the number of vertical columns in the matrix. The number of rows, m, may be equal to or different from the number of columns, n. In this example, the number of rows, m, is equal to 3, and the number of columns, n, is equal to 4, resulting in a quantity of (m×n) electrical switches, which in this example equals to 12. In FIG. 3, rows m and columns n are projected in to the vertical plane and are evenly space in the vertical plane. More generally, in various examples, the spacing between each pair of adjacent rows m is equal, and the spacing between each pair of adjacent columns is equal, along a portion of the contoured, lateral surface 116, whether that surface portion extends, vertically, horizontally, or diagonally, as examples. As will be shown below, in some examples, the row spacing may vary or the column spacing may vary. Varying the spacing between electric switches 136 may be advantageous for ease of reach for a thumb or a finger.

Figure 4:
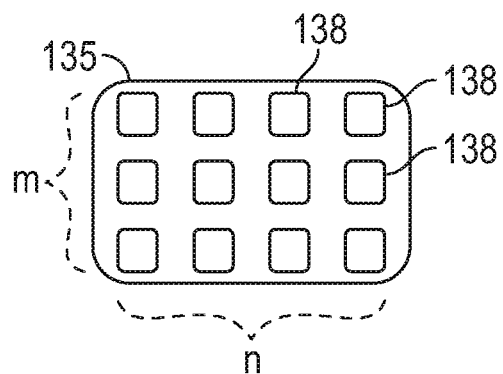
FIG. 4 shows the cover plate of the electronic pointing device of FIG. 1 in accordance with various examples.

FIG. 4 shows cover plate 135 with holes 138 arranged in an m×n matrix, having row and column spacing corresponding to the matrix of switches 136 in FIG. 3. The total number of the holes 138 is equal to a total number of the electrical switches (m×n).

Figure 5:
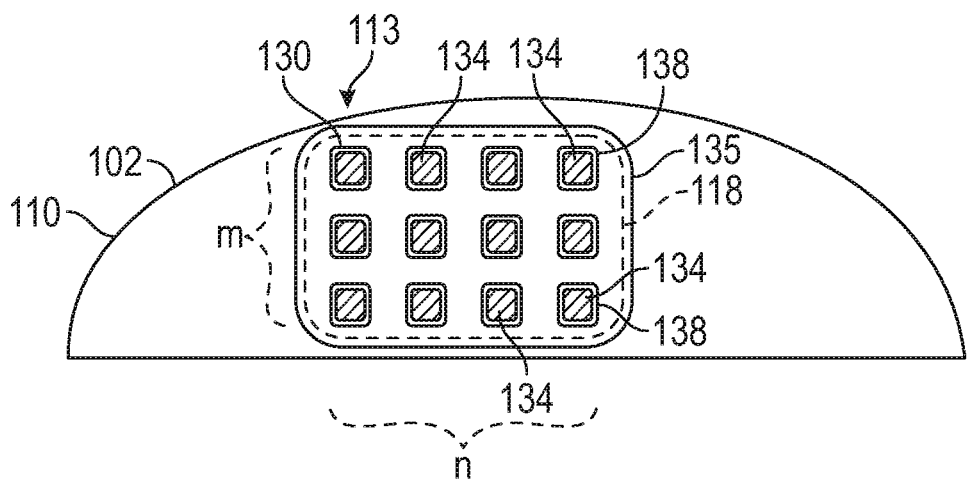
FIG. 5 shows a side view of the electronic pointing device of FIG. 1 in accordance with various examples.

In FIG. 5, a full set of button members 134 is installed in cover plate 135, which is mounted over aperture 118 of housing 110, with each button member 134 aligned with an electrical switch 136 (FIG. 3). In this example, the number of button members 134 is a value of m×n, which is equal to the number of electrical switches 136 and is equal to the number of holes 138 in cover plate 135.

Figure 6:
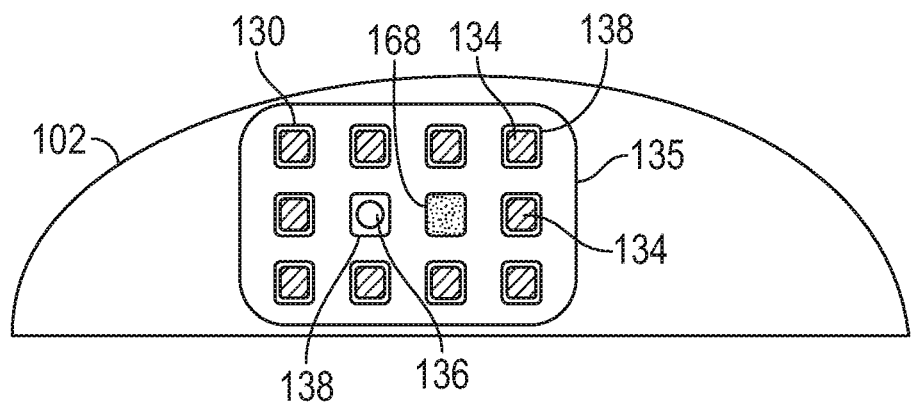
FIG. 6 shows a side view the electronic pointing device of FIG. 1 having another selected arrangement of buttons in accordance with various examples.

In FIG. 6, pointing device 102 is reconfigured such that the total number of the button members 134 is less than the total number of the electrical switches 136, i.e., less than the value of m×n, which in this example has a value of 12. In this example, a total of ten button members 134 are installed within the m×n holes 138 of cover plate 135. The central two holes 138 lack a button member 134. The forward-most of these two holes 138 (leftward in FIG. 6) has nothing installed, such that the aligned electrical switch 136 is visible. An individual plug 168 is installed in the rearward of these two central holes 138 to block the hole 138 and prevent access to the corresponding electrical switch 136 (not visible). FIG. 6 is an example of how the physical lay-out, in other words the arrangement, of the second set of buttons 130 is customizable by a user to suit user preferences regarding software operation, comfort, and visual aesthetics, as examples.

Figure 7:
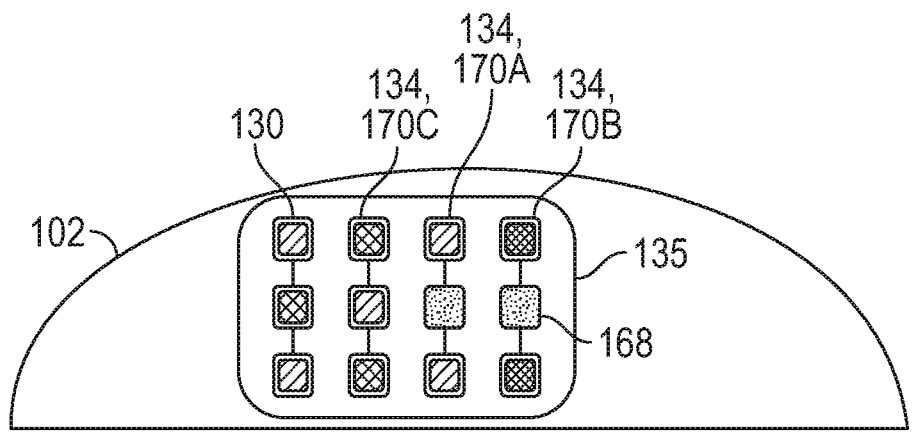
FIG. 7 shows a side view the electronic pointing device of FIG. 1 having another selected arrangement of buttons in accordance with various examples.

In FIG. 7, electronic pointing device 102 is configured with yet another arrangement of button members 134. Device 102 includes the same m×n matrix pattern of electrical switches 136, and cover plate 135 includes the same m×n matrix pattern holes 138 as are shown above. However, the type and layout of objects within holes 138 is different. In FIG. 7, the second set of buttons 130 includes a plurality of button members 134 and a plurality of plugs 168 located outside or in front of electrical switches 136. In this example, the arrangement includes ten button members 134 and two of plugs 168. In addition, the group of button members 134 includes a plurality of types of buttons members, which, in this example, include three button member types, 170A, 1706, 170C. The button member types 170A, 170B, 170C may be distinguished by an image, a text character, a color, a texture, height, hardness, flexibility, or another characteristic for the corresponding button members 134. In some examples, each button member 134 has a characteristic that is unique from the other button members 134. Having a unique characteristic for a button member type or for a button member may aid a user in distinguishing the buttons members or remembering the layout pattern of the button members 134 that may be associated with different actions that may be assigned by software commands and may help the user to operate the second set of buttons 130 without looking at the buttons. Within the m×n matrix, the button member types, 170A, 170B, 170C and plugs 168 are arranged in a button member pattern. The button member pattern may be prearranged by the manufacturer or may be selected by a user. In this way, physical lay-out of the second set of buttons 130 is customizable by a user to suit user preferences regarding software operation, comfort, and visual aesthetics. The button pattern or the number button members for each button member type 170A, 170B, 170C or the number of plugs 168 may be changed. In some arrangements, a button member type 170A, 170B, 170C may be omitted, or plugs 168 may be omitted.

Figure 8:
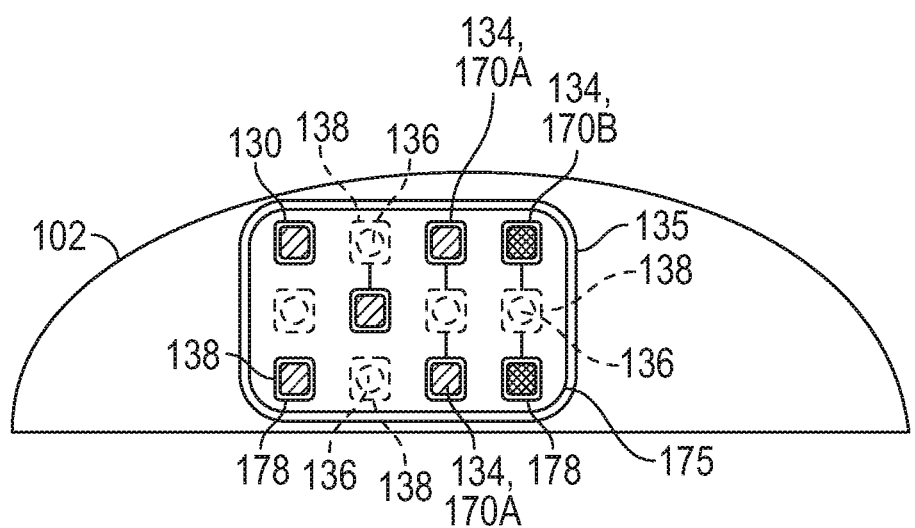
FIG. 8 shows a side view the electronic pointing device of FIG. 1 with an overlay coupled to the matrix of buttons in accordance with various examples.

Referring now to FIG. 8, an overlay 175 is positioned over and coupled to cover plate 135. Device 102 includes the same m×n matrix pattern of electrical switches 136, and cover plate 135 includes the same m×n matrix pattern holes 138 as are shown above. Overlay 175 includes a plurality of holes 178 that are aligned with select holes 138 on cover plate 135, and a plurality of buttons 138 extend through these aligned pairs of holes 138, 178. However, the number of holes 178 in the overlay 175 is less than the m×n number of holes 138 in cover plate 135. Thus, a plurality of the holes 138 and the corresponding electrical switches 136 are covered by the overlay 175, which prevents actuation of the corresponding electrical switches 138. Covering the holes 138 and switches 136 with overlay 175 protects switches 136 without the use of individual plugs 168 (e.g., FIG. 7). In some examples, an overlay may cover more or fewer holes 138 and electrical switches 136. In some examples, an overlay includes text or a visual pattern, which may, for example, aid a user in understanding how to use the buttons or may fulfill an aesthetic purpose. In some examples, the number of holes 178 in an overlay is equal to the number of holes 138 in cover plate 135 so the overlay does not cover any holes 138 and electrical switches 136. In some examples, the overlay 175 does not include any holes 178, and the overlay 175 covers all the holes 138 and electrical switches 136.

Figure 9:
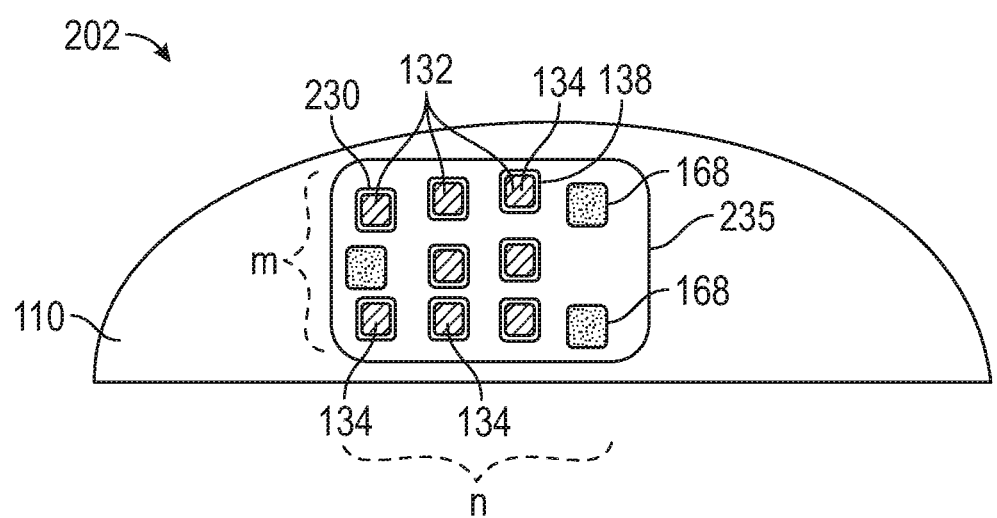
FIG. 9 shows an electronic pointing device in accordance with various examples.

FIG. 9 shows another example of an electronic pointing device 202 that includes many of the same features as electronic pointing device 102, such as housing 110, a first set of buttons 120, a position transducer 140 coupled to the housing 110, and an electronics module 145, as examples. However, pointing device 202 includes a different second set of buttons 230 having a different quantity and different arrangement of buttons 132 along thumb location 114 of lateral surface 116. Second set of buttons 230 includes a plurality of buttons 132 comprising plurality of button members 134 held by cover plate 235 in alignment with plurality of electrical switches (behind the button members 134) coupled to housing 110. Cover plate 235 is removably coupled to housing 110 and may be held by removable fasteners or by built-in clips or notches, as examples. Cover plate 235 includes a plurality of holes 138 to receive button members 134. Each button member 134 is independently removably disposed in one of the holes 138 to actuate a corresponding electrical switch. In various examples, removing, installing, or swapping a button member 134 involves removing and reinstalling cover plate 235. The components of the second set of buttons 230 are arranged as a matrix having a quantity of m rows and a quantity of n columns and having a quantity of (m×n−1) members (i.e., m multiplied by n minus 1). Thus, pointing device 202 includes (m×n−1) electrical switches 136 in housing 110 and (m×n−1) holes 138 in cover plate 235. In this example, the rows are unevenly spaced apart, and the columns are unevenly spaced apart. The variation in spacing may help a user operate the buttons or remember the placement of individual buttons more easily. In FIG. 9, the total number of the buttons members 134 is less than a total number of the electrical switches 136. A plurality of plugs 168 cover the holes 138 and electrical switches 136 that are not covered by buttons members 134. Various other examples similar to device 202 may have another arrangement of buttons, a different number of buttons 230, a different number of plugs 168, no plugs 168, or multiple button member types. Some examples of device 202 may include an overlay coupled to cover plate 235.

In some examples, a cover plate 135, 235 is incorporated as a part of housing 110. In some examples, the functionality or aesthetics of an overlay is integrated into a cover plate. For example, a cover plate may cover-over an electrical switch 136. In FIG. 1 lateral surface 116 with the matrix of buttons 130, 230 is located to the left of axis 111 and to the left of the first set of buttons 120, making electronic pointing device 102 a right-handed device. Even so, in some examples a pointing device 102, 202 includes a left-handed configuration with lateral surface 116 and buttons 130 located on the right side of axis 111 and buttons 130 to be operated by a left thumb. In some examples, a matrix of buttons 130, 230 having individually removable button members 134 is located at a position accessible to a user's finger rather than or in addition to being accessible to the user's thumb.

What is claimed is:
1. An electronic pointing device comprising:
a housing;
a position transducer coupled to the housing;
a plurality of electrical switches coupled to the housing, wherein the plurality of electrical switches are arranged in an m×n matrix, wherein m is a number of rows in the matrix and n is a number of columns in the matrix;
a cover plate removably coupled to the housing, wherein the cover plate includes a plurality of holes, each hole of the cover plate is aligned with one of the electrical switches;
a plurality of button members, wherein each button member is independently and removably disposed in one of the holes of the cover plate and is aligned to engage one of the electrical switches to actuate that electrical switch; and
an overlay coupled to the cover plate, the overlay including overlay holes through which the plurality of button members extend, the overlay covering holes in the cover plate not containing one of the plurality of button members.

2. The electronic pointing device of claim 1, wherein m is greater than one and n is greater than one.

3. The electronic pointing device of claim 2, wherein the rows are unevenly spaced apart or the columns are unevenly spaced apart.

4. The electronic pointing device of claim 1, wherein a total number of the button members is less than the value of m multiplied by n.

5. The electronic pointing device of claim 4, wherein at least one of the holes is blocked to prevent access to the corresponding electrical switch.

6. The electronic pointing device of claim 1, wherein a total number of the holes is equal to a total number of the electrical switches, and a total number of the button members is less than a total number of the electrical switches.

7. The electronic pointing device of claim 1, wherein the electrical switches are disposed along a lateral surface of the housing, and wherein each button member is to be actuated by a thumb of a user.

8. An electronic pointing device comprising:
   a housing;
   a position transducer coupled to the housing;
   a plurality of electrical switches coupled to the housing;
   a cover plate removably coupled to the housing, wherein the cover plate includes a plurality of holes, each hole aligned with one of the plurality of electrical switches;
   a plurality of button members, wherein each button member is removably disposed in one of the holes of the cover plate and disposed to engage the corresponding, aligned electrical switch to actuate that electrical switch,
   wherein each button member is individually and independently removable from the corresponding hole of the cover plate and the corresponding electrical switch; and
   an overlay coupled to the cover plate, the overlay including overlay holes through which the plurality of button members extend, the overlay covering hobs in the cover plate not containing one of the plurality of button members.

9. The electronic pointing device of claim 8, wherein the electrical switches are arranged as an m×n matrix, wherein m is a number of rows in the matrix and n is a number of columns in the matrix.

10. The electronic pointing device of claim 9, wherein m is greater than one and n is greater than one.

11. The electronic pointing device of claim 8, wherein a number of the button members is less than a number of the electrical switches.

12. The electronic pointing device of claim 8, wherein the electrical switches are disposed within a lateral surface of the housing, and wherein each button member is to be actuated by a thumb of a user.

\* \* \* \* \*